US008352893B1

(12) United States Patent
Lin et al.

(10) Patent No.: US 8,352,893 B1
(45) Date of Patent: Jan. 8, 2013

(54) CIRCUIT TOPOLOGY RECOGNITION AND CIRCUIT PARTITIONING

(75) Inventors: Pole Shang Lin, Fremont, CA (US); Tamer Raed Fahim Riad, San Jose, CA (US); Kuei Shan Wen, Fremont, CA (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 13/235,153

(22) Filed: Sep. 16, 2011

(51) Int. Cl.
*G06F 17/50* (2006.01)

(52) U.S. Cl. ........ 716/105; 716/104; 716/106; 716/108; 716/111; 716/113

(58) Field of Classification Search ........... 716/104–114
See application file for complete search history.

(56) References Cited

U.S. PATENT DOCUMENTS

| | | | |
|---|---|---|---|
| 7,149,674 B1 * | 12/2006 | Sirichotiyakul et al. | 703/15 |
| 8,060,355 B2 * | 11/2011 | Kerns et al. | 703/14 |
| 2006/0085782 A1 * | 4/2006 | Ward | 716/18 |
| 2009/0300566 A1 * | 12/2009 | Gee et al. | 716/7 |
| 2010/0185993 A1 * | 7/2010 | Baumgartner et al. | 716/5 |

* cited by examiner

*Primary Examiner* — Nha Nguyen

(57) ABSTRACT

Aspects of the invention relate to circuit topology recognition and circuit partitioning. In various embodiments of the invention, diode-connected transistors can be identified in a circuit netlist based on the unique structure. From the diode-connected transistors, current mirrors can be found. The current mirrors may be employed for locating differential pairs used in the input stage of operational amplifiers and for locating supply voltage and ground nodes in the netlist. The subcircuits that are strongly connected due to feedback loops of operational amplifiers in the circuit can then be identified and grouped together for circuit analysis and simulation.

26 Claims, 6 Drawing Sheets

CIRCUIT TOPOLOGY RECOGNITION AND CIRCUIT PARTITIONING

FIELD OF THE INVENTION

The present invention is directed to computer-aided circuit design tools. Various aspects of the invention may be particularly useful for improving circuit partitioning and simulation based on circuit topology recognition.

BACKGROUND OF THE INVENTION

Transistor-level circuit simulation is important for designing integrated circuits. Simulating a circuit's behavior before actually building it can greatly improve design efficiency by making faulty designs known and providing insight into the behavior of electronics circuit designs. A circuit simulator formulates circuit equations and then numerically solves them to compute the circuit response to a particular stimulus. Developed about forty years ago, SPICE (Simulation Program with Integrated Circuit Emphasis) simulators are still being widely used in part due to its precision. While offering superior precision, SPICE simulators are limited to the simulation of small subcircuit blocks because of their memory capacity requirements and performance limitations.

The Fast-SPICE simulators have been developed to address these limitations. One of the main approaches adopted by the Fast-SPICE simulators is breaking a circuit into smaller subcircuits and solving each subcircuit independently. Further, if the signals in one or more subcircuits are latent during an interval of time, then it is not necessary to solve for them during that interval of time. These techniques, however, rely upon assumptions such as those about signals between the subcircuits. The assumptions may turn out to be incorrect if the circuit is not partitioned correctly. Thus, how a circuit is partitioned affects the accuracy of Fast-SPICE simulation.

While automatic circuit partitioning has been developed for the relatively simple circuit topologies found in digital MOS (metal oxide semiconductor) circuits, it remains a challenge for analog and mixed-signal circuits. FIG. 2 illustrates an example of an operational amplifier 200 being partitioning by a conventional automatic circuit partitioning method. In FIG. 2, the operational amplifier 200 is broken into several subcircuits by the conventional automatic circuit partitioning method. Only subcircuits 220, 240 and 260 are shown. Like many operational amplifiers, the operational amplifier 200 has a negative feedback loop 280. It should be appreciated that one or more subcircuits outside an operational amplifier may also be in the feedback loop for the operational amplifier. The feedback loop make all the subcircuits in the feedback loop such as subcircuits 220, 240 and 260 in FIG. 2 strongly coupled so that they are required to be simulated as a whole. Without identifying the feedback loop, a conventional automatic circuit partitioning method breaks an operational amplifier and its feedback into several subcircuits for simulation, thereby resulting in incorrect simulation results. It is thus desirable to find an efficient method for identifying operational amplifiers and their feedback loops in a transistor-level netlist.

BRIEF SUMMARY OF THE INVENTION

Aspects of the invention relate to circuit topology recognition and circuit partitioning. In various embodiments of the invention, operational amplifiers and their feedback loops are identified in a circuit netlist based on current mirrors. A current mirror comprises a diode-connected transistor and a mirror transistor. Diode-connected transistors can be recognized in the circuit netlist based on the unique structure. From the diode-connected transistors, current mirrors in the circuit netlist can be found. The current mirrors may be employed for locating differential pairs used in the input stage of the operational amplifiers and for locating voltage-reference nodes in the circuit netlist. The voltage-reference nodes may be used to assist in circuit partitioning by serving as termination or break points. From the differential pairs, low impedance paths are determined. The low impedance paths can lead to one or more outputs of the subcircuits in which the differential pairs reside. The subcircuits that are strongly connected due to feedback loops of the operational amplifiers can then be identified and grouped together for circuit analysis and simulation. One subcircuit type is DC-connected components.

DETAILED DESCRIPTION OF THE INVENTION

Figure 1:
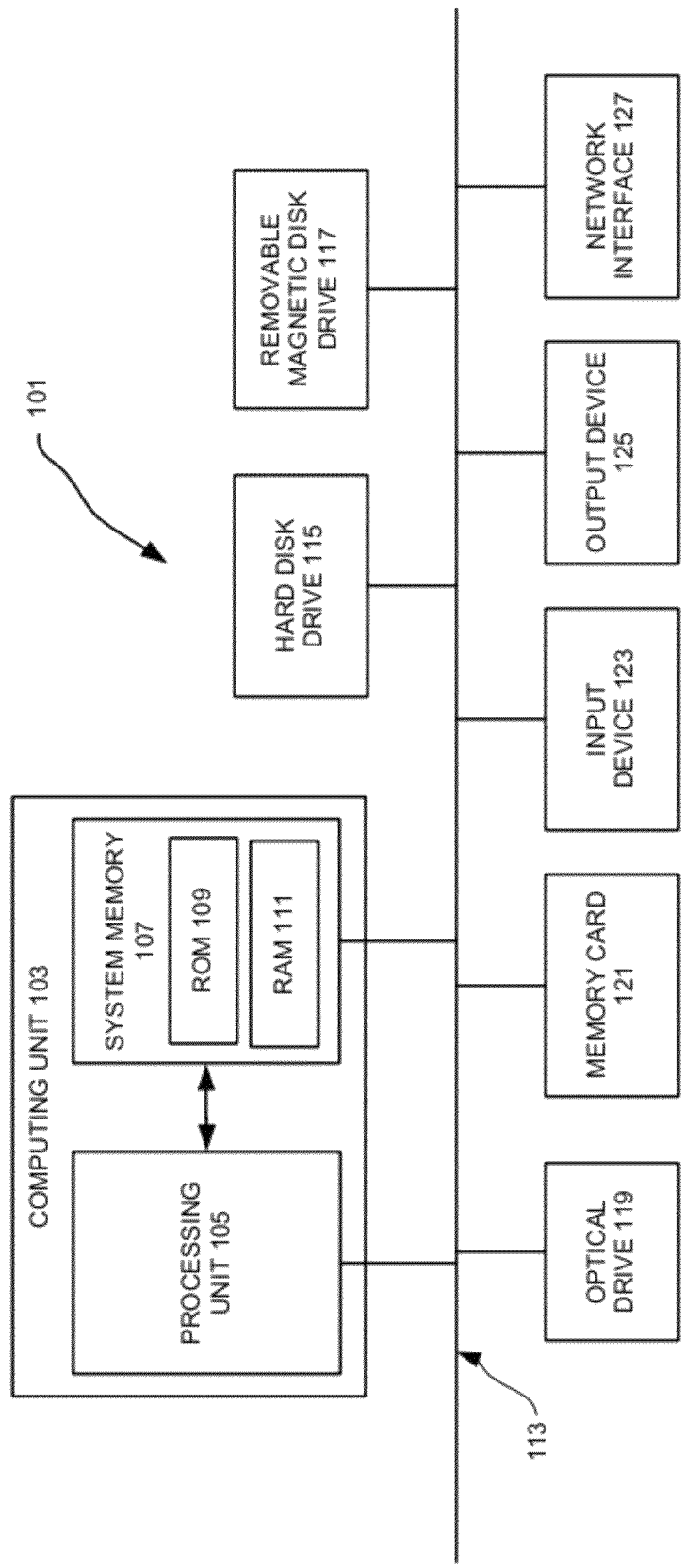
FIG. 1 illustrates a programmable computer system with which various embodiments of the invention may be employed.
Figure 2:
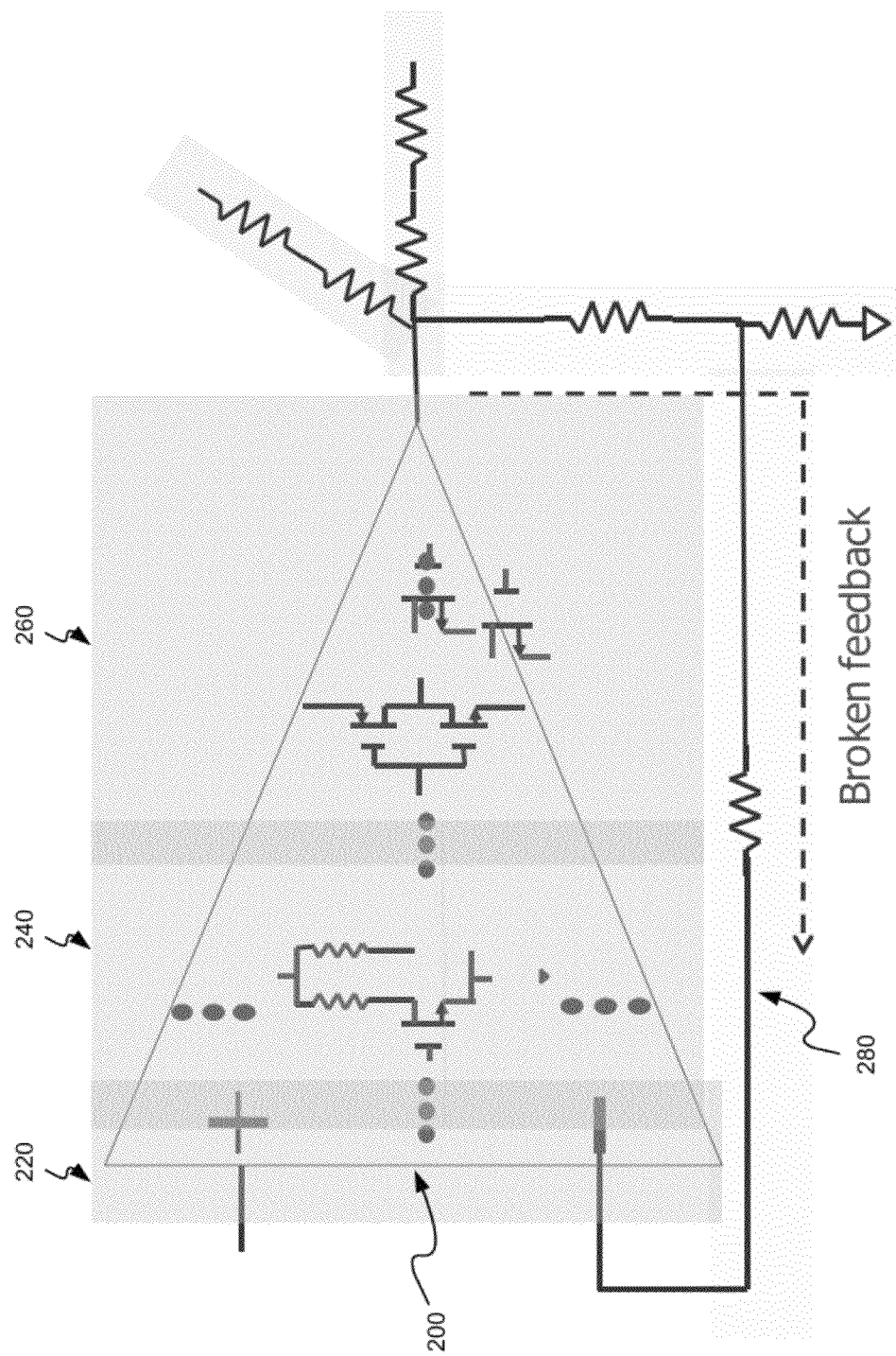
FIG. 2 illustrates an example of an operational amplifier and its feedback being partitioned into several subcircuits.

Various aspects of the present invention relate to circuit topology recognition and circuit partitioning. In the following description, numerous details are set forth for purpose of explanation. However, one of ordinary skill in the art will realize that the invention may be practiced without the use of these specific details. In other instances, well-known features have not been described in details to avoid obscuring the present invention.

Although the operations of some of the disclosed methods, apparatus, and systems are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "determine" and "identify" to describe the disclosed methods. These terms are high-level abstractions of the actual operations that are performed. The actual operations that correspond to these terms may vary depending on the particular implementation and are readily discernible by one of ordinary skill in the art.

Any of the disclosed techniques can be implemented in whole or in part by software comprising computer-executable instructions stored on computer-readable media. Such software can comprise, for example, an appropriate electronic design automation ("EDA") software tool (e.g., an automatic test pattern generation ("ATPG") tool). Such software can be executed on a single computer or on a networked computer (e.g., via the Internet, a wide-area network, a local-area network, a client-server network, or other such network). For clarity, only certain selected aspects of the software-based implementations are described. Other details that are well known in the art are omitted. For example, it should be understood that the disclosed technology is not limited to any specific computer language, program, or computer. For example, the disclosed technology can be implemented using any commercially available computer executing a program written in any commercially available or otherwise suitable language. Any of the disclosed methods can alternatively be implemented (partially or completely) in hardware (e.g., an ASIC, PLD, or SoC).

Any data produced from any of the disclosed methods (e.g., intermediate or final test patterns, test patterns values, or control data) can be stored on computer-readable media (e.g., tangible computer-readable media, such as one or more CDs, volatile memory components (such as DRAM or SRAM), or nonvolatile memory components (such as hard drives)) using a variety of different data structures or formats. Such data can be created, updated, or stored using a local computer or over a network (e.g., by a server computer).

As used in this disclosure, the singular forms "a," "an," and "the" include the plural forms unless the context clearly dictates otherwise. Additionally, the term "includes" means "comprises." Moreover, unless the context dictates otherwise, the term "coupled" means electrically or electromagnetically connected or linked and includes both direct connections or direct links and indirect connections or indirect links through one or more intermediate elements not affecting the intended operation of the circuit. Furthermore, the term "design" is intended to encompass data describing an entire microdevice, such as an integrated circuit device or micro-electromechanical system (MEMS) device. This term also is intended to encompass a smaller group of data describing one or more components of an entire microdevice, however, such as a layer of an integrated circuit device, or even a portion of a layer of an integrated circuit device. Still further, the term "design" also is intended to encompass data describing more than one microdevice, such as data to be used to create a mask or reticle for simultaneously forming multiple microdevices on a single wafer. The layout design data may be in any desired format, such as, for example, the Graphic Data System II (GDSII) data format or the Open Artwork System Interchange Standard (OASIS) data format proposed by Semiconductor Equipment and Materials International (SEMI). Other formats include an open source format named Open Access, Milkyway by Synopsys, Inc., and EDDM by Mentor Graphics, Inc.

In this disclosure, the term "subcircuit" is used in a broad sense. A DC-connected component is a subcircuit.

Exemplary Operating Environment

Various embodiments of the invention may be implemented through the execution of software instructions by a computing device, such as a programmable computer. Further, various embodiments of the invention may be implemented by a computer executing various software instructions for performing the functionality of the invention, or by software instructions for performing the functionality of the invention stored on a computer-readable medium. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Circuit Partitioning, Operational Amplifier and Current Mirror

As discussed earlier, the Fast-SPICE simulators have been developed to overcome the capacity and speed problems of the conventional SPICE tools. One of the main features of the Fast-SPICE simulators is circuit partitioning. In a circuit partitioning process, a circuit design is divided into subcircuits. Rather than using a single large matrix for the whole circuit design, each subcircuit is represented as a small matrix that can be solved separately during simulation. As such, the Fast-SPICE simulators can handle much more complex circuit designs than the conventional SPICE simulators. Another advantage of the circuit partitioning is that each subcircuit can be simulated with different time steps. Some subcircuits containing slow-moving signals can use fewer steps over the same time interval than those containing high frequency signals.

Figure 3:
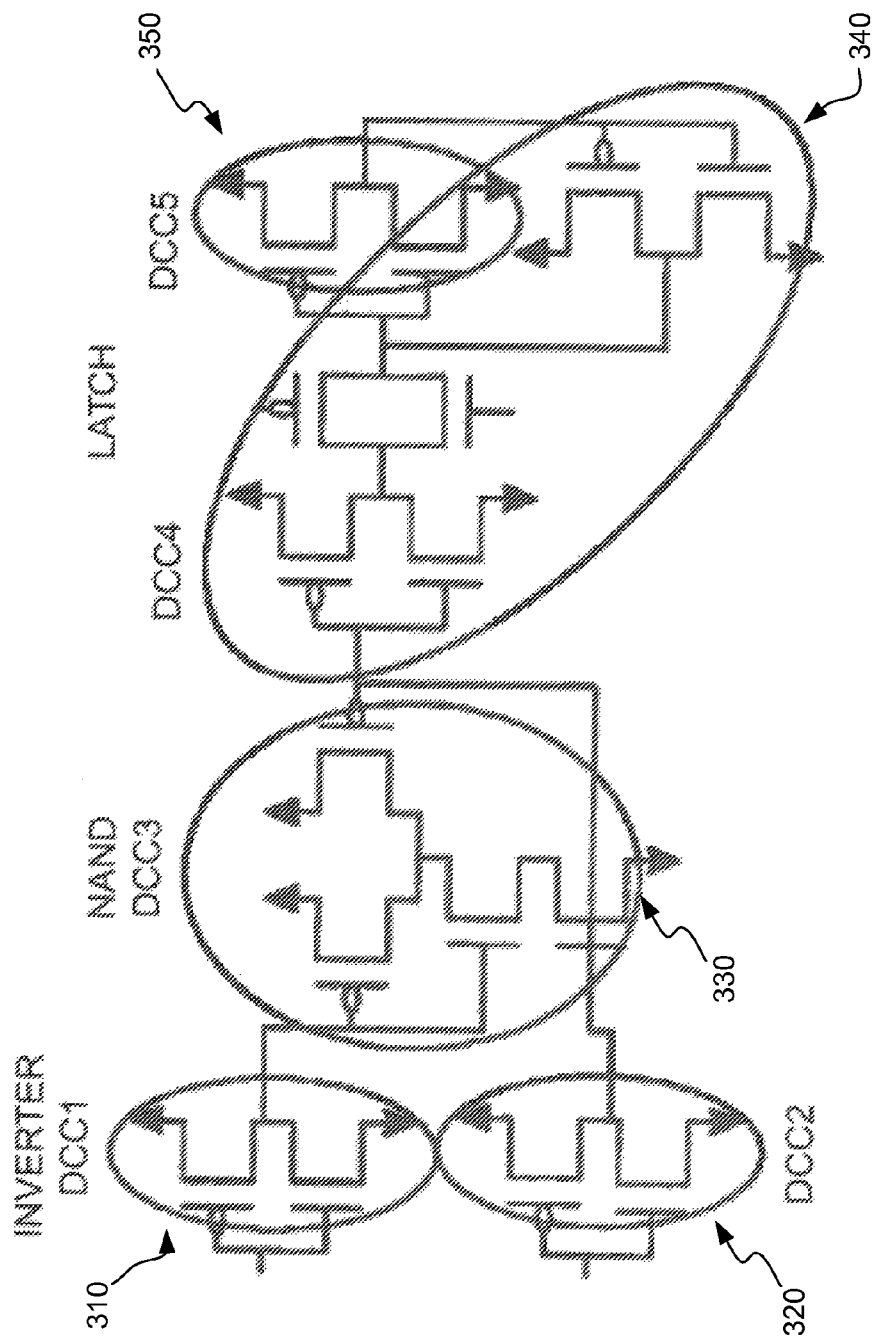
FIG. 3 illustrates an example of a circuit design being partitioned into DC-connected components.

One of the circuit partitioning methods divides a circuit into DC-connected components (or channel-connected components). This method is referred to as DCC partitioning hereinafter. Since the gate current is zero and currents flow between source and drain terminals of MOS (Metal Oxide Semiconductor) devices, a MOS circuit can be partitioned by insulating gates from channels and splitting the supply voltage node and the ground node. Thus, a DC-connected component is, for example, a set of nodes that are connected to each other mainly through the source and drain terminals of transistors in a MOS circuit. The inputs of a DC-connected component are either the primary inputs of the circuit or the gate nodes of the devices that are part of the DC-connected component, while the outputs of a DC-connected component are the primary outputs of the circuit or nodes that are connected to the gate nodes of devices in other DC-connected components. FIG. 3 illustrates an example of the DCC partitioning of a simple circuit. As seen in the figure, a DC-connected component may be a simple gate such as inverters 310, 320 and an NAND gate 330. A more complex gate may comprise multiple DC-connected components—latch 340-350 in the figure comprises two DC-connected components. Besides the gate terminal of a MOS transistor, a capacitor may also be used as a break point for partitioning a circuit.

As discussed earlier, assumptions may have to be made about signals between subcircuits for circuit simulation. One of the assumptions is that subcircuits are not strongly connected. Two subcircuits are strongly connected if each is reachable from the other, directly or indirectly. Subcircuits related to operational amplifiers are examples of strongly connected subcircuits. An operational amplifier usually works in a feedback mode. However, operational amplifiers may be partitioned into several subcircuits and some or all of them may be strongly connected due to feedback. Moreover, the feedback loop may include one or more subcircuits outside the operational amplifier that are also strongly connected. These strongly connected subcircuits, inside or outside the operational amplifier, may need to be grouped into a single subcircuit for circuit simulation to work correctly. Therefore, it is desirable to find methods that can analyze netlist data of a circuit and recognize the circuit topology for an operational amplifier with its feedback loop efficiently.

Figure 4:
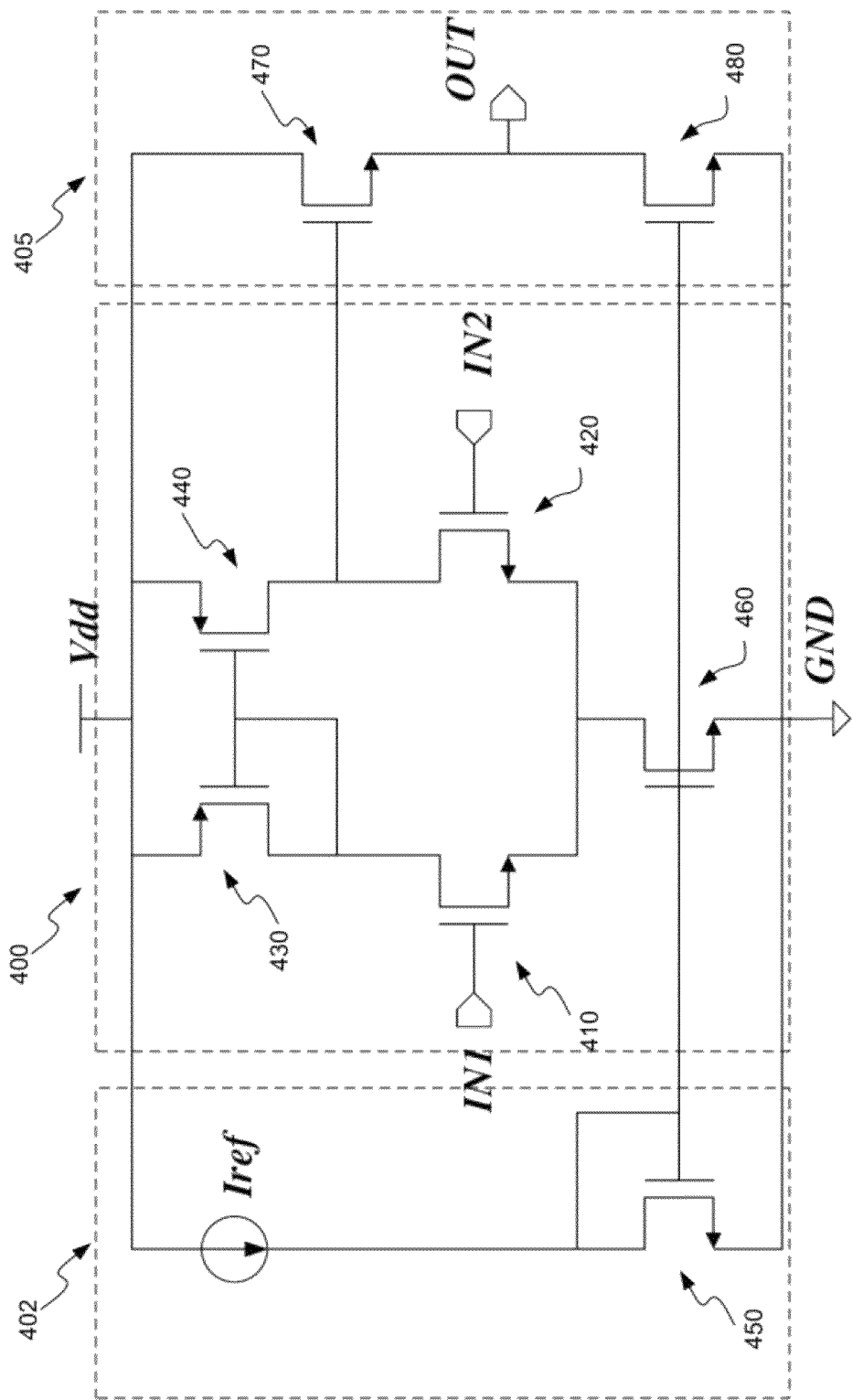
FIG. 4 illustrates a schematic circuit diagram of an operational amplifier.

With various implementations of the invention, the differential pair for an operational amplifier may first be identified and used as a starting point for identifying the operational amplifier and its feedback loop. The differential pair, comprising two transistors, is in the input stage of the operation amplifier and functions as a differential amplifier. FIG. 4 illustrates a schematic circuit diagram of an operational amplifier. This operational amplifier can be divided into three DC-connected components 400, 402 and 405. In the DC-connected component 400, transistors 410 and 420 form a differential pair and their gate terminals serve as the differential input terminals. Accordingly, the DC-connected component 400 may be referred to as the differential pair subcircuit. The DC-connected component 405 is the output stage of the operational amplifier. According to various embodiments of the invention, the differential pair for an amplifier can be located (or identified) based on a current mirror formed by two transistors—a diode-connected transistor and a mirror transistor. This is because a differential pair is usually coupled to one of the two transistors in a current mirror and uses it as a current source. In FIG. 4, there are three current mirrors: current mirrors 430/440, 450/460 and 450/470. While the current mirrors 430/440 and 450/460 are both coupled to differential pair 410/420, only the mirror transistor 460 in the current mirror 450/460 serves as the current source for the differential pair 410/420. In many operational amplifier designs, the mirror transistor in a current mirror that serves as the current source for a differential pair is coupled through its drain terminal to the source terminals of the differential pair, similar to what is shown in FIG. 4. It should be noted that in some operational amplifier designs, it is the diode-connected transistor rather than the mirror transistor that is coupled to the source terminals of a differential pair. It should also be appreciated that while only N-type MOSFET transistors are shown in FIG. 4, the above observation also applies to operational amplifiers that include other transistors such as bipolar transistors and P-type transistors.

Circuit Topology Recognition Tool And Methods

Figure 5:
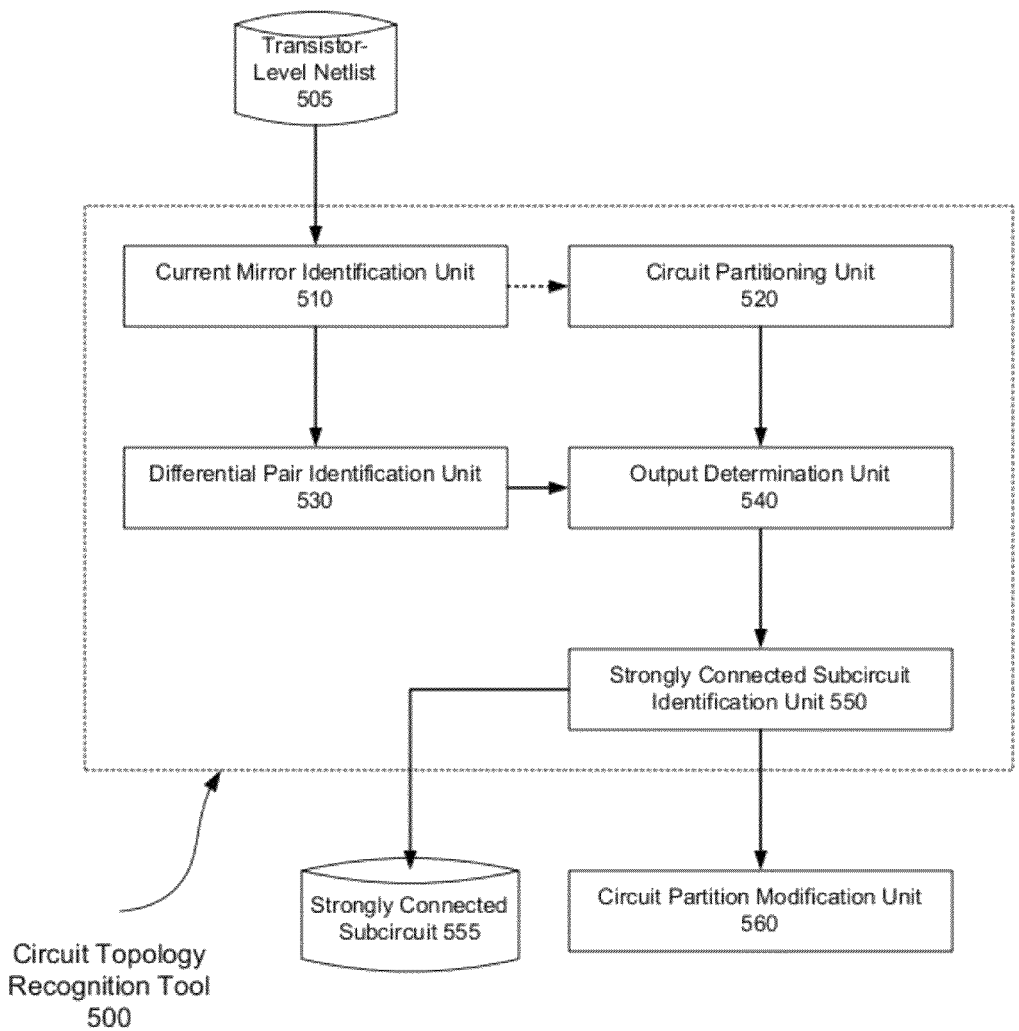
FIG. 5 illustrates an example of a tool for circuit topology recognition and circuit partitioning according to various embodiments of the invention.

FIG. 5 illustrates an example of a tool for circuit topology recognition and circuit partitioning according to various embodiments of the invention. As seen in the figure, the circuit topology recognition tool 500 may include five units: a current mirror identification unit 510, a circuit partitioning unit 520, a differential pair identification unit 530, an output determination unit 540 and a strongly connected subcircuit identification unit 550. As will be discussed in more detail below, some implementations of the circuit topology recognition tool 500 may cooperate with (or incorporated) one or more of a transistor-level netlist database 505, a circuit partition modification unit 560, and a strongly connected subcircuit database 555.

According to some embodiments of the invention, one or some of the current mirror identification unit 510, the circuit partitioning unit 520, the differential pair identification unit 530, the output determination unit 540, the strongly connected subcircuit identification unit 550, and the circuit partition modification unit 560 may be implemented by one or more computing systems, such as the computing system illustrated in FIG. 1, executing programmable instructions. Correspondingly, some other embodiments of the invention may be implemented by software-executable instructions, stored on a computer-readable medium, for instructing a computing system to perform functions of one or some of the current mirror identification unit 510, the circuit partitioning unit 520, the differential pair identification unit 530, the output determination unit 540, the strongly connected subcircuit identification unit 550, and the circuit partition modification unit 560. The computer-readable medium may be, for example, a magnetic storage device, an optical storage device, a "punched" surface type device, or a solid state storage device. While the transistor-level netlist database 505 and the strongly connected subcircuit database 555 are shown as separate units in FIG. 5, a single computer-readable medium may be used to implement some or all of these databases.

For ease of understanding, circuit topology recognition and circuit partitioning methods that may be employed according to various embodiments of the invention will be described with reference to the circuit topology recognition tool 500 in FIG. 5. It should be appreciated, however, that alternate implementations of a circuit topology recognition tool may be used to perform the circuit topology recognition and circuit partitioning methods according to various embodiments of the invention. Likewise, the circuit partitioning unit 520 illustrated in FIG. 5 may be employed to perform other circuit topology recognition and circuit partitioning methods according to various embodiments of the invention.

With various implementations of the invention, the current mirror identification unit 510 is configured to identify one or more current mirrors from transistor-level netlist data for a circuit. Each of the one or more current mirrors comprises a diode-connected transistor and a mirror transistor. The diode-connected transistor has a unique configuration—gate/base and drain/collector of the field-effect/bipolar transistor are shorted. This unique configuration allows the current mirror identification unit 510 to recognize diode-connected transistors quickly and determine whether the recognized diode-connected transistors form current mirrors with other transistors.

The source/emitter terminals of the two transistors in a current mirror are usually connected to voltage-reference nodes such as the supply voltage node (for P-type transistors) or the ground node (for N-type transistors). The voltage-reference nodes serve as breaking points for circuit partitioning as discussed earlier. Accordingly, the circuit partitioning unit 520 may use the identified current mirrors to assist in partitioning the circuit for circuit simulation. This is especially useful for partitioning a complex circuit design that uses a hierarchical netlist. In a hierarchical netlist, the supply voltage and ground nodes are not obvious. In some embodiments of the invention, the circuit partitioning unit 520 is configured to partition the circuit into a plurality of DC-connected components based on the current mirrors identified by the current mirror identification unit 510.

Besides being coupled to either the supply voltage node or the ground node, the drain/collector terminal of the mirror transistor in a current mirror may be connected to a differential pair as the current source. As discussed earlier, the differential pair 410/420 in FIG. 4 is coupled to the mirror transistor 460 through its drain terminal. Accordingly, the differential pair identification unit 530 is configured to use current mirrors to identify differential pairs. In some cases such as the type 741 operational amplifiers, the differential pair may be coupled to a current mirror through not the mirror transistor but the diode-connected transistor. Therefore, the differential pair identification unit 530 may, additionally or alternatively, search for differential pairs from the drain/collector terminals of the diode-connected transistors in the current mirrors.

With a differential pair being identified, the output determination unit 540 determines one or more outputs of an differential pair subcircuit based on the differential pair. The differential pair subcircuit is the subcircuit in which the differential pair is located. Conventional methods based on signal propagation may be employed for locating the one or more outputs. Outputs of a DC-connected component are either primary outputs of the circuit or nodes that are connected to the gate nodes of devices in other DC-connected components. Alternatively or additionally, the output determination unit 540 may determine the one or more outputs of the differential pair subcircuit by tracing along low impedance paths starting from the differential pair. A low impedance path is formed by a set of low impedance nodes. The low impedance nodes may be determined according to low impedance and high impedance rules. With some implementations of the invention, the low impedance rules define low impedance nodes as source/emitter terminals of current buffers, drain/collector terminals of diode-connected transistors, and compound resistors with resistance less than a predetermined value. The high impedance rules define high impedance nodes as drain/collector terminals of one or more transistors; compound resistors with resistance greater than or equal to a predetermined value, and RC networks terminated by a ground node or a supply voltage node. Current buffers are usually transistors with their gates/bases connected to constant DC voltages. A constant DC voltage may be provided, for example, through a DC voltage source or a diode-connected transistor.

Figure 6:
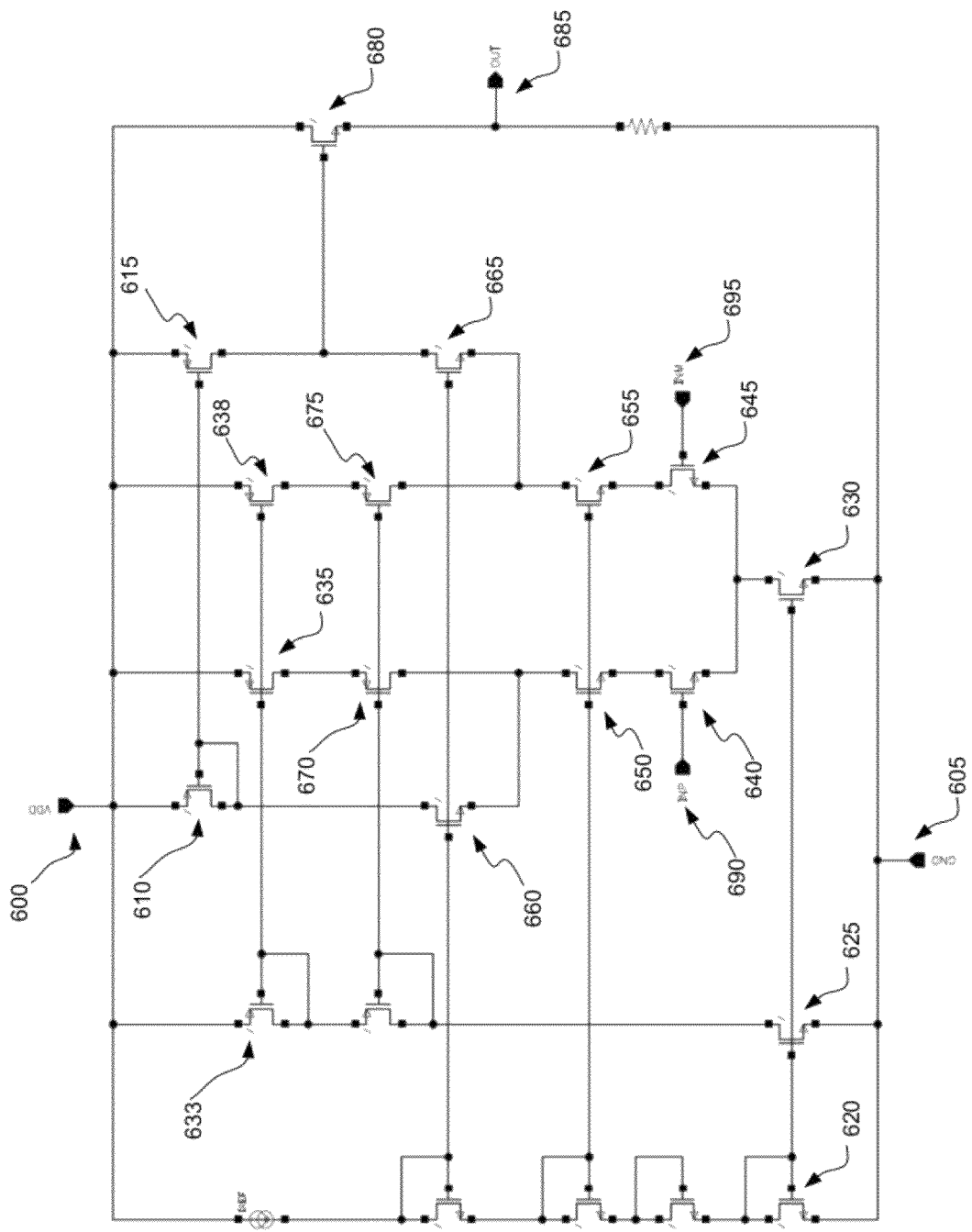
FIG. 6 illustrates a schematic circuit diagram of another operational amplifier which is used to explain how low impedance paths are determined for locating an output of a differential pair subcircuit.

FIG. 6 illustrates a schematic circuit diagram of another operational amplifier which is used to explain how low impedance paths are determined for locating an output of a differential pair subcircuit. The current mirror identification unit 510 may find five current mirrors in the operational amplifier shown in the figure: 610/615, 620/625, 620/630, 633/635 and 633/638. These current mirrors can help the circuit partitioning unit 520 to locate two voltage-reference nodes: the supply voltage node 600 and the ground node 605. Also based on these current mirrors, the differential pair identification unit 530 can find the differential pair formed by transistors 640/645, which uses the mirror transistor 630 as a current source.

To search for low impedance paths, the output determination unit 540 starts from the two drain nodes of the differential pair. Each of the transistors 640 and 645 are coupled to a second transistor (650 to 640 and 655 to 645) to form a cascode. Because the transistors 650 and 655 are current buffer and their source terminals are "seen" by the differential pair, they are low impedance nodes and the two low impedance paths can proceed to the drain terminals of the transistors 650 and 655, respectively. Similarly, the two low impedance paths may further proceed to the drain terminals of transistors 660 and 665, respectively, which are current buffers as well with the source terminals facing the low impedance paths. However, the drain terminals of transistors 670 and 675 are coupled to the drain terminals of the transistors 650 and 655, respectively, and thus represent high impedance nodes to the two low impedance paths. Therefore, the two low impedance paths do not proceed to the source terminals of the two transistors 670 and 675. The same analysis applies to the transistor 615 and thus the low impedance path originated from the transistor 645 terminates at the drain node of the transistor 665. On the other hand, the low impedance path originated from the transistor 640 faces a low impedance node represented by the diode-connected transistor 610 and its mirror transistor 615. Thus, this low impedance path can proceed to the drain terminal of the mirror transistor 615 where it terminates since the drain terminal of the transistor 665 represents a high impedance node. Since the drain terminal of the mirror transistor 615 is directly connected to the drain terminal of the transistor 665, the two low impedance paths meets here and this node is an output of the differential pair subcircuit. The output of the differential pair subcircuit is coupled to the input of another DC-connected component that includes a transistor 680—the output stage subcircuit.

The strongly connected subcircuit identification unit 550 is configured to identify one or more strongly connected subcircuits that form a loop with the differential pair subcircuit. Staring from one of the one or more outputs of the differential pair subcircuit, the strongly connected subcircuit identification unit 550 analyzes a number of subcircuits that are connected directly or indirectly to the output and determines whether there exists a subcircuit with its output coupled to one or both inputs of the differential pair. If there exists such a subcircuit, this subcircuit, the differential pair subcircuit and the subcircuits between them are strongly connected due to feedback. The maximum number of the subcircuits to be analyzed may be set at five in some embodiments of the invention. The information about the differential pair subcircuit and the feedback loop may be stored in the strongly connected subcircuit database 555. With some implementations of the invention, the differential pair subcircuit and other subcircuits in the feedback loop are grouped into one subcircuit for circuit analysis, circuit simulation or both by the circuit partition modification unit 560.

CONCLUSION

Having illustrated and described the principles of the disclosed technology, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only preferred examples of the technologies and should not be taken as limiting the scope of the invention. Rather, the scope of the invention is defined by the following claims and their equivalents. We therefore claim as our invention all that comes within the scope and spirit of these claims.

What is claimed is:

1. A method of circuit topology recognition, executed by at least one processor of a computer, comprising:
   receiving transistor-level netlist data for a circuit;
   identifying one or more current mirrors in the circuit by analyzing the transistor-level netlist data by using the at least one processor of the computer;
   partitioning the circuit into a plurality of subcircuits;
   identifying a differential pair in the circuit based on the one or more current mirrors;
   determining one or more outputs of a differential pair subcircuit, the differential pair subcircuit being the subcircuit in which the differential pair is located;
   identifying one or more strongly connected subcircuits in the plurality of subcircuits that form a feedback loop with the differential pair subcircuit based on the one or more outputs; and
   grouping the one or more strongly connected subcircuit and the differential pair subcircuit into one subcircuit for circuit analysis, circuit simulation or both.

2. The method recited in claim 1, wherein the circuit simulation is a Fast-SPICE simulation.

3. The method recited in claim 1, wherein the circuit is a subcircuit of a large circuit design.

4. The method recited in claim 1, wherein the identifying one or more current mirrors comprises:
   identifying diode-connected transistors in the transistor-level netlist; and
   identifying one or more current mirrors based on the diode-connected transistors.

5. The method recited in claim 1, wherein the partitioning the circuit is based on the one or more current mirrors.

6. The method recited in claim 1, wherein the partitioning the circuit comprises:
   identifying voltage-reference nodes based on source/emitter terminals of transistors in the one or more current mirrors.

7. The method recited in claim 1, wherein the plurality of subcircuits are a plurality of DC-connected components, the differential pair subcircuit is a differential pair DC-connected component, and the one or more feedback loop subcircuits are the one or more feedback loop DC-connected components.

8. The method recited in claim 1, wherein the identifying a differential pair comprises:
   searching for a differential pair from drain/collector terminals of transistors in one of the one or more current mirrors.

9. The method recited in claim 1, wherein the identifying a differential pair comprises:
   searching for a differential pair from drain/collector terminals of mirror transistors in one of the one or more current mirrors.

10. The method recited in claim 1, wherein the one or more outputs of the differential pair subcircuits is determined by tracing along one or two low impedance paths starting from the differential pair.

11. The method recited in claim 10, wherein the one or two low impedance paths are determined based on low impedance and high impedance rules.

12. The method recited in claim 11, wherein the low impedance and high impedance rules comprises:
    low impedance nodes comprising a source/emitter terminal of a current buffer, a drain/collector terminal of a diode-connected transistor, and a compound resistor with resistance less than a predetermined value; and
    high impedance nodes comprising drain/collector terminals of one or more transistors; a compound resistor with resistance greater than or equal to a predetermined value, and an RC network terminated by a ground node or a supply voltage node.

13. A non-transitory processor-readable medium storing processor-executable instructions for causing one or more processors to perform a method of circuit topology recognition, the method comprising:
    receiving transistor-level netlist data for a circuit;
    identifying one or more current mirrors in the circuit by analyzing the transistor-level netlist data;
    partitioning the circuit into a plurality of subcircuits;
    identifying a differential pair in the circuit based on the one or more current mirrors;
    determining one or more outputs of a differential pair subcircuit, the differential pair subcircuit being the subcircuit in which the differential pair is located;
    identifying one or more strongly connected subcircuits in the plurality of subcircuits that form a feedback loop with the differential pair subcircuit based on the one or more outputs; and
    grouping the one or more strongly connected subcircuits and the differential pair subcircuit into one subcircuit for circuit analysis, circuit simulation or both.

14. The non-transitory processor-readable medium recited in claim 13, wherein the identifying one or more current mirrors comprises:
    identifying diode-connected transistors in the transistor-level netlist; and
    identifying one or more current mirrors based on the diode-connected transistors.

15. The non-transitory processor-readable medium recited in claim 13, wherein the partitioning the circuit comprises:
    identifying a supply voltage node, a ground node or both based on source/emitter terminals of transistors in the one or more current mirrors.

16. The non-transitory processor-readable medium recited in claim 13, wherein the identifying a differential pair comprises:
    searching for a differential pair from drain/collector terminals of transistors in one of the one or more current mirrors.

17. The non-transitory processor-readable medium recited in claim 13, wherein the one or more outputs of the differential pair subcircuits is determined by tracing along one or two low impedance paths starting from the differential pair.

18. The non-transitory processor-readable medium recited in claim 17, wherein the one or two low impedance paths are determined based on low impedance and high impedance rules.

19. The non-transitory processor-readable medium recited in claim 18, wherein the low impedance and high impedance rules comprises:
- low impedance nodes comprising a source/emitter terminal of a current buffer, a drain/collector terminal of a diode-connected transistor, and a compound resistor with resistance less than a predetermined value; and
- high impedance nodes comprising drain/collector terminals of one or more transistors; a compound resistor with resistance greater than or equal to a predetermined value, and an RC network terminated by a ground node or a supply voltage node.

20. A system comprising:
- one or more processors, the one or more processors programmed to perform a method of circuit topology recognition, the method comprising:
- receiving transistor-level netlist data for a circuit;
- identifying one or more current mirrors in the circuit by analyzing the transistor-level netlist data;
- partitioning the circuit into a plurality of subcircuits;
- identifying a differential pair in the circuit based on the one or more current mirrors;
- determining one or more outputs of a differential pair subcircuit, the differential pair subcircuit being the subcircuit in which the differential pair is located;
- identifying one or more strongly connected subcircuits in the plurality of subcircuits that form a feedback loop with the differential pair subcircuit based on the one or more outputs; and
- grouping the one or more strongly connected subcircuits and the differential pair subcircuit into one subcircuit for circuit analysis, circuit simulation or both.

21. The system recited in claim 20, wherein the identifying one or more current mirrors comprises:
- identifying diode-connected transistors in the transistor-level netlist; and
- identifying one or more current mirrors based on the diode-connected transistors.

22. The system recited in claim 20, wherein the partitioning the circuit comprises:
- identifying a supply voltage node, a ground node or both based on source/emitter terminals of transistors in the one or more current mirrors.

23. The system recited in claim 20, wherein the identifying a differential pair comprises:
- searching for a differential pair from drain/collector terminals of transistors in one of the one or more current mirrors.

24. The system recited in claim 20, wherein the one or more outputs of the differential pair subcircuits is determined by tracing along one or two low impedance paths starting from the differential pair.

25. The system recited in claim 24, wherein the one or two low impedance paths are determined based on low impedance and high impedance rules.

26. The system recited in claim 25, wherein the low impedance and high impedance rules comprises:
- low impedance nodes comprising a source/emitter terminal of a current buffer, a drain/collector terminal of a diode-connected transistor, and a compound resistor with resistance less than a predetermined value; and
- high impedance nodes comprising drain/collector terminals of one or more transistors; a compound resistor with resistance greater than or equal to a predetermined value, and an RC network terminated by a ground node or a supply voltage node.

* * * * *